United States Patent
Davies et al.

(10) Patent No.: US 8,590,317 B2
(45) Date of Patent: * Nov. 26, 2013

(54) GAS TURBINE ENGINE STARTING METHOD AND CONTROL DEVICE

(75) Inventors: Gareth Huw Davies, Coleby (GB); John Wilkinson, Sudbrooke (GB); Stuart Wilkinson, legal representative, Cheshire (GB); Maria Helen Kathalin Wilkinson, legal representative, Sudbrooke (GB); Richard Woods, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 955 days.

This patent is subject to a terminal disclaimer.

(21) Appl. No.: 12/227,470

(22) PCT Filed: Feb. 27, 2007

(86) PCT No.: PCT/EP2007/051822
§ 371 (c)(1),
(2), (4) Date: Apr. 21, 2009

(87) PCT Pub. No.: WO2007/134886
PCT Pub. Date: Nov. 29, 2007

(65) Prior Publication Data
US 2010/0293960 A1    Nov. 25, 2010

(30) Foreign Application Priority Data
May 22, 2006    (EP) ................................ 06010534

(51) Int. Cl.
*F02C 7/26*    (2006.01)

(52) U.S. Cl.
USPC ................................... 60/778; 60/790

(58) Field of Classification Search
USPC .............. 60/778, 39.094, 776, 786–788, 790, 60/39.281; 701/100
See application file for complete search history.

(56) References Cited

U.S. PATENT DOCUMENTS

| 3,310,937 | A |   | 3/1967 | Smith |  |
|---|---|---|---|---|---|
| 5,107,674 | A | * | 4/1992 | Wibbelsman et al. | 60/778 |
| 7,000,405 | B2 | * | 2/2006 | McKelvey et al. | 60/786 |
| 7,386,982 | B2 | * | 6/2008 | Runkle et al. | 60/779 |
| 7,509,812 | B2 | * | 3/2009 | Mehrer et al. | 60/778 |

FOREIGN PATENT DOCUMENTS

| FR | 2 658 562 A1 | 8/1991 |
|---|---|---|
| WO | WO 03/014551 A1 | 2/2003 |

OTHER PUBLICATIONS

Josef Frötschel; "Fluzeugturbinen Im Betrieb"; 1973; pp. 92-93; XP002411516; ISBN: 3-87356-030-5; Holsten Verlag, Hamburg 92240.

* cited by examiner

*Primary Examiner* — Andrew Nguyen

(57) ABSTRACT

A method of starting a gas turbine engine by use of a start sequence is provided. Turbine speed and fuel delivery are coordinated so as to provide a fuel/air mixture at an ignition device allowing a successful ignition. If a successful ignition has not occurred by end of the start sequence the gas turbine engine is purged and the start sequence is repeated after the purging of the gas turbine engine.

8 Claims, 3 Drawing Sheets

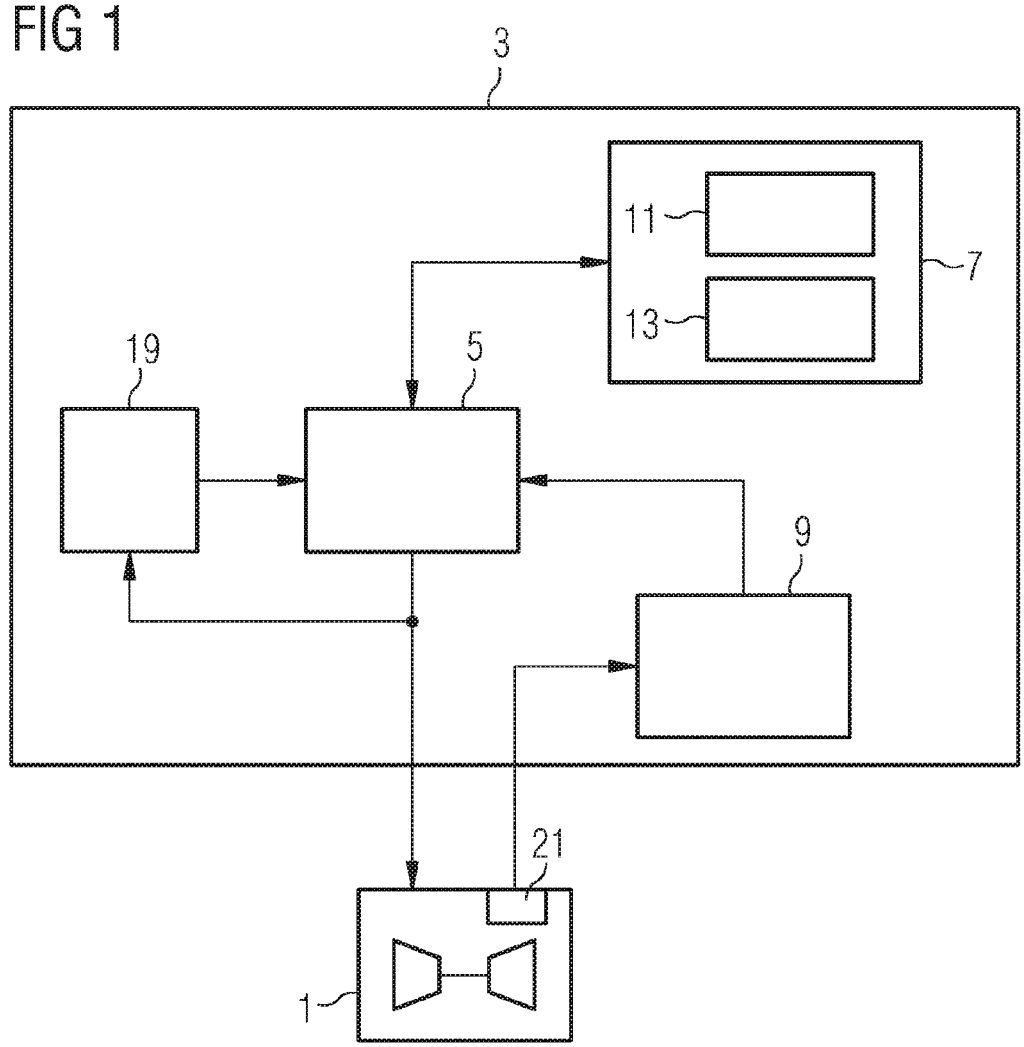

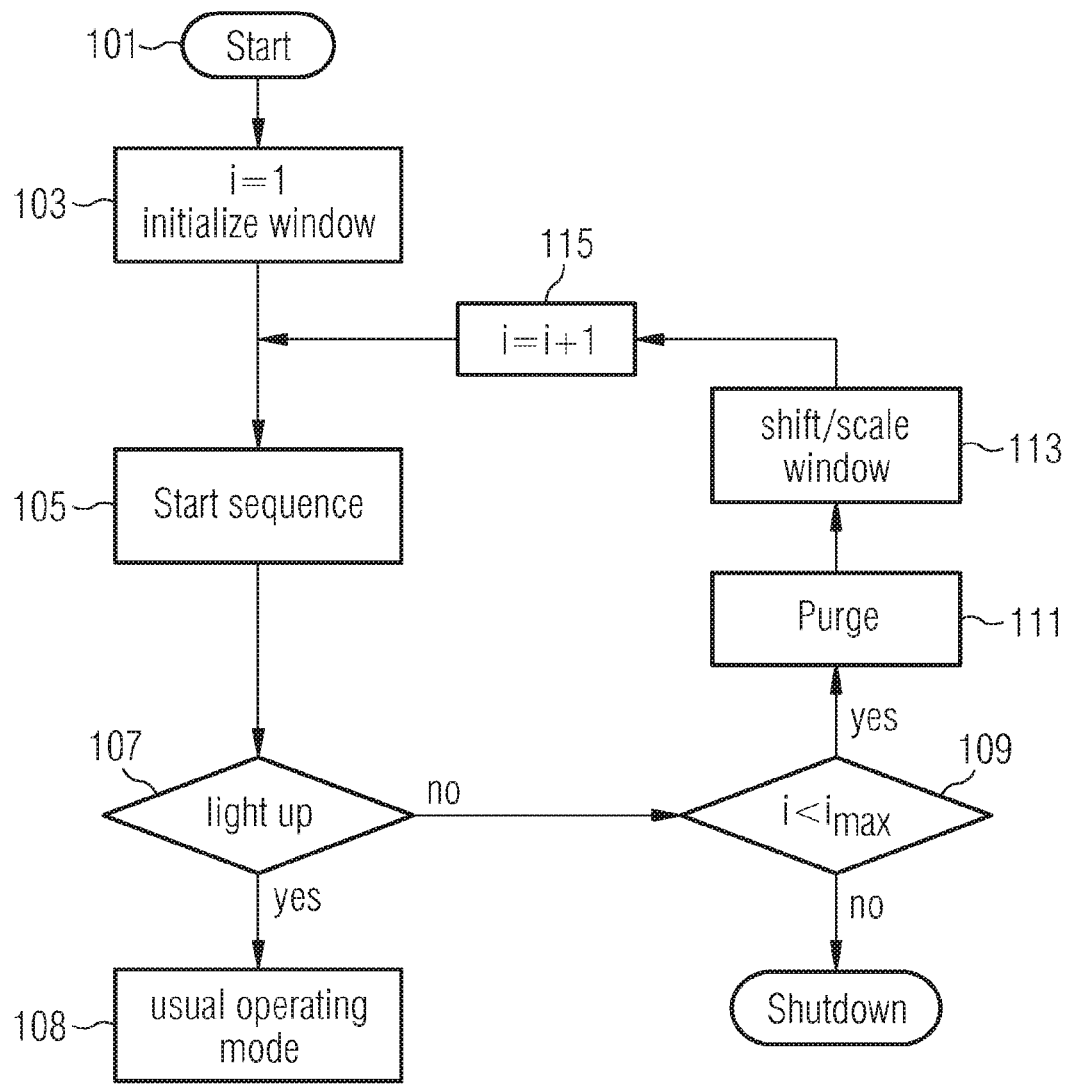

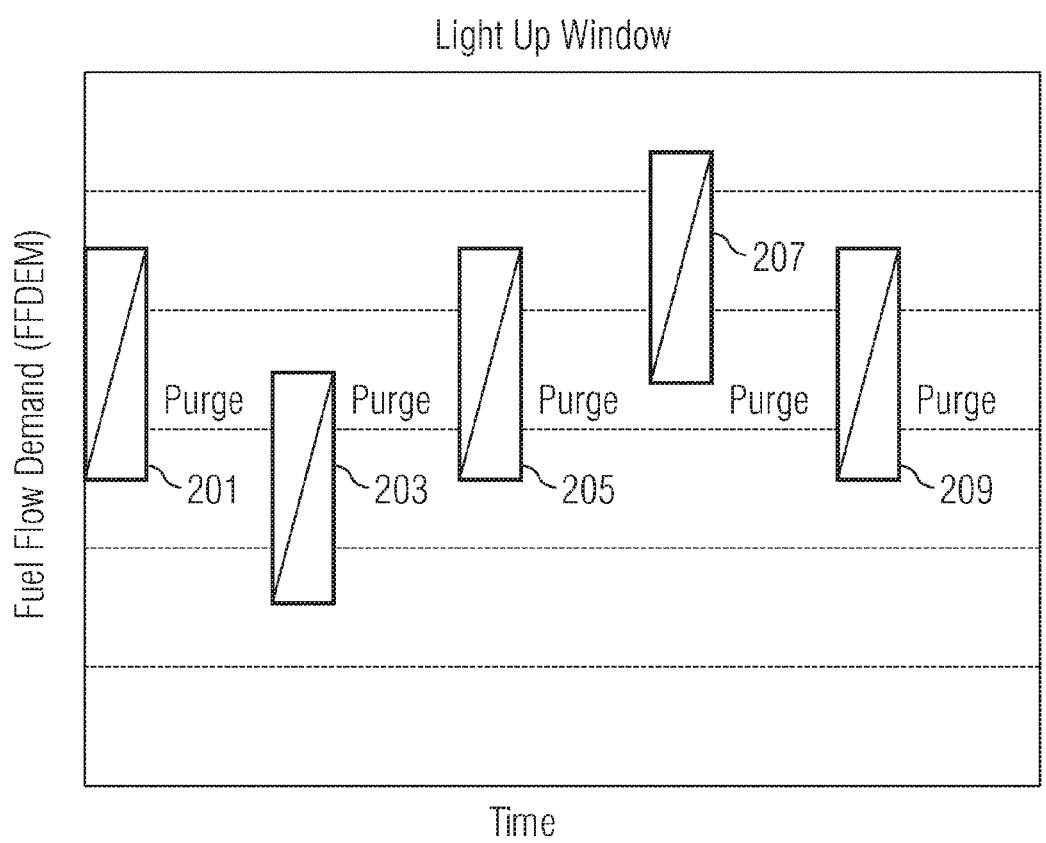

GAS TURBINE ENGINE STARTING METHOD AND CONTROL DEVICE

CROSS REFERENCE TO RELATED APPLICATIONS

This application is the US National Stage of International Application No. PCT/EP2007/051822, filed Feb. 27, 2007 and claims the benefit thereof. The International Application claims the benefits of European application No. 06010534.3 filed May 22, 2006, both of the applications are incorporated by reference herein in their entirety.

FIELD OF INVENTION

The present invention relates to a starting method for a gas turbine engine and a control device for controlling the start of a gas turbine engine. In particular, the invention addresses the start reliability of gas turbine engines particularly with regards to achieving light up or ignition (i.e. achieving flame on).

BACKGROUND OF THE INVENTION

Optimum ignition conditions for gas turbine engines are subject to variation between starts due to a variety of factors, e.g. ambient temperature, gas turbine temperatures, fuel calorific value, fuel content, pressures, repeatability of fuel and air delivery systems, etc. In a typical start system for a gas turbine engine one uses an auxiliary drive unit for driving the turbine and a control unit providing a start sequence in which turbine speed and fuel delivery are coordinated to provide a fuel/air mixture at an ignition device allowing a successful ignition.

In a typical start sequence, the speed of the gas turbine, which is during start driven by an auxiliary motor, and/or the fuel flow to the combustion system are progressively increased over a set period of time, the so called light-up window. The length of the light-up window is a function of the range of engine speeds at which starting is most likely to occur, typically between 5% and 20% of the rated engine speed and the accumulation rate of fuel in the combustor. During the light-up window a number of ignition opportunities appears, the actual number of which depends on the number of sparks that can be delivered per second by the igniter of the gas turbine engine and the length (duration) of the light-up window. Therefore one likes to have the light-up window as long as possible. However, the length of the light-up window is delimited by a number of factors. If, e.g. the turbine is accelerated too quickly the fuel injection system will not have enough time to provide a sufficient amount of fuel before the window of engine speeds at which starting is most likely to occur is exceeded. On the other hand, if the turbine is accelerated too slowly, it may happen that an amount of fuel inside the combustor is reached which could be dangerous to the engine while the turbine speed has still not reached the maximum speed within the light-up window. However, for example the acceleration rate of the turbine depends on the ambient conditions. On a cold day, a battery driven starter motor may not be capable of accelerating the engine quickly due to possible low power supply. On the other hand, on a very hot day, the same motor with the same battery may be capable of accelerating the engine very quickly. To cope with the mentioned limitations a compromise is typically required between maximizing the light-up window to cover for wide variations in the actual optimum window and minimizing the variation rate to increase the number of ignition opportunities (sparks) during the actual optimum window, without establishing a potentially dangerous fuel amount inside the combustion system during the light-up window.

Typical start sequences for gas turbine engines are, e.g. described in U.S. Pat. No. 5,844,383, U.S. Pat. No. 5,907,949, where a temporary increase in fuel flow during start to enhance the heat release is described, U.S. Pat. No. 4,464,895, where a pulsating (modulated) liquid fuel flow which improves the atomization and thereby the ignition capability is described and in RU 2078971, where the fuel flow is varied in relation to the operating condition for the gas turbine before start.

If a successful ignition cannot be detected after the light-up window, the gas turbine is usually shut down due to a so called "no-light-up trip".

SUMMARY OF INVENTION

It is therefore an objective of the present invention to provide a method of starting a gas turbine engine with a control device controlling a start of a gas turbine engine by which the number of no-light-up trips can be reduced.

This object is solved by the method of starting a gas turbine engine and a control device, as claimed in the claims. The depending claims define further developments of the invention.

In the inventive method of starting a gas turbine engine a start sequence is used in which turbine speed and fuel delivery are coordinated so as to provide a fuel/air mixture at an ignition device allowing a successful ignition. If a successful ignition has not occurred by the end of the start sequence, the gas turbine engine is purged and, after the purging, the start sequence is repeated.

By purging the gas turbine engine the accumulated fuel can be driven out of the combustion system so that the start sequence can be repeated without the danger of damaging the engine due to excess fuel in the combustion system. Since the purging can be done rather quickly by just stopping the fuel delivery while the engine is still rotating, start sequences can be repeated rather quickly.

The inventive method therefore allows for repeating a number of start sequences before shut down of the engine due to a failure of ignition.

During the start sequence, the turbine speed may be varied, e.g. by use of an external motor, through a range of turbine speeds at which starting is most likely to occur. The range of turbine speeds is shifted and/or scaled when repeating the start sequence. In other words, if the turbine speed is, e.g. linearly increased from a starting point to an end point in the start-up window, the starting point and the end point may be shifted from one start sequence to another. Alternatively or simultaneously the range of turbine speeds between the starting point and the end point could be increased, e.g. by lowering the starting point and increasing the end point. The shifting and/or scaling of the range of turbine speed may follow a fixed scheme.

Besides or instead of the turbine speed, the fuel/air ratio of the fuel/air mixture which is introduced into the combustor may be varied through a range of fuel/air ratios at which starting is most likely to occur in the start sequence. In this case, the range of fuel/air ratios can be shifted and/or scaled from one start sequence to another. The varying of the fuel/air ratio can e.g. be achieved by varying the fuel delivery with respect to the delivery of air, which in turn depends on the rotational speed of the engine. Like in the case of the rotational speed of the engine, the starting and end points of the optimum window for the fuel/air ratio can be shifted and/or scaled, e.g. spread. The shifting and/or scaling of the range of fuel/air ratios may follow a fixed scheme.

The purging and repeating of start sequences is stopped when a predetermined stop condition is reached or a successful ignition is detected. As an example of a stop condition, a preset number of start sequences can be used which shall not be exceeded.

The inventive control device for controlling a start of a gas turbine engine is suitable for performing the inventive method. It comprises:

A window generator which is adapted to generate a window signal representing a range of turbine speeds and/or a range of fuel/air ratios at which starting is most likely to occur. In other words, the window signal represents the light-up window for the start sequence. A processor unit is connected to the window generator for receiving the window signal. It is adapted to begin a start sequence for the gas turbine engine and to vary, during the start sequence, the turbine speed and/or the mixing ratio of a fuel/air mixture through the range of the turbine speed and/or the range of fuel/air ratios defined by the window signal. An ignition monitor monitors the success of the ignition sequence. The monitor is adapted to generate condition signal representing success or failure of ignition after the start sequence has finished. The processor unit is connected to the ignition monitor to receive the condition signal after the start sequence is finished. Further, the processor unit is adapted to generate a purging signal when the condition signal indicates a failure of ignition and to output the purging signal to the gas turbine engine which causes a purging of the engine. Further, the processor unit is adapted to begin another start sequence after the purging is finished.

If the purging is executed over a certain time period, the end of the time period may indicate the end of the purging. If a time period for the purging is not fixed, the purging may be finished when it is detected that the fuel content in the combustor has fallen under a certain level or condition.

To allow varying the range of turbine speeds and/or the range of fuel/air mixtures from one start sequence to another, the window generator may comprise a shifting unit and/or a scaling unit which is connected to the processor unit to receive the purging signal. The shifting unit and/or the scaling unit is/are adapted to shift and to scale, respectively, the range of turbine speeds and/or the range of fuel/air ratios if it receives the purging signal.

To allow for finishing the repeating of starting sequences the control device advantageously comprises a counter which is connected to the processor unit for receiving a purging signal. The counter is adapted to count the number of purges, and to output a stop signal when a preset number of purges has been counted. The stop signal causes the processor unit not to begin another start sequence.

BRIEF DESCRIPTION OF THE DRAWINGS

Further features, properties and advantages of the present invention will become clear from the following description of embodiments of invention in conjunction with the accompanying drawings.

FIG. 1 shows a block diagram of an embodiment of the inventive control device.

FIG. 2 shows a flow diagram describing an embodiment of the inventive method.

FIG. 3 shows the variation of the light-up window during the inventive method.

DETAILED DESCRIPTION OF INVENTION

An embodiment of the inventive control device 3 for controlling the start of a gas turbine engine 1 is shown in form of a block diagram in FIG. 1. The control device 3 comprises, in the shown embodiment, a processor unit 5, a window generator 7, an ignition monitor 9, and a counter 19. The window generator 7 includes a shifting unit 11 and a scaling unit 13. All units of the control device 3 may be realised as hardware or software.

The processor unit 5 is connected to the gas turbine engine 1 to begin and control a start sequence in order to light up the engine 1. During the start sequence, the turbine speed and the fuel to air ratio are ramped up within a light-up window of turbine speeds and fuel to air ratios, respectively. The windows are defined by starting and end points for the ramps. The fuel to air ratio may be varied by a fuel flow command defining a certain fuel flow for a given turbine speed since the turbine speed also determines the air flow through the combustion system. The processor unit 5 receives the actual window for the start sequence from the window generator 7.

The processor unit 5 is further connected to the ignition monitor 9 which outputs a condition signal representing successful or unsuccessful light-up. To detect successful or unsuccessful light-up the ignition monitor 9 is connected to an ignition detector 21 in the gas turbine engine 1.

The processor unit 5 is adapted to generate a purging signal if it receives a condition signal from the ignition monitor 9 which represents a failure of ignition. The purging signal is then output to the gas turbine engine 1 and causes the engine to stop fuel delivery but to continue with delivery of air. Hence, excess fuel accumulated in the burner and the combustion chamber of the engine is blown out of the engine so that after the purging no potentially dangerous fuel-to-air ratio is present in the combustion system. After purging the engine the processor unit 5 outputs another start sequence to the gas turbine engine 1 to make another attempt to light-up the engine.

For a new starting sequence, the processor unit 5 receives a new light-up window from the window generator 7 after the shifting unit 11 has shifted the range of turbine speeds and/or fuel to air ratios given in a start up window. Additionally or alternatively, the scaling unit 13 has multiplied the range of turbine speeds and/or fuel to air ratios given in a start-up window by a scaling factor. Although, in the present embodiment, a shifting unit 11 and a scaling unit 13 are present, the window generator could, in principle, be equipped with a shifting unit 11 or a scaling unit 13, only. Before the new starting sequence is initiated, the new start-up window, which is shifted and/or scaled with respect to preceding start-up window, is output to the processor unit 5. The processor unit 5 then starts the new starting sequence after it has received a new start-up window.

A sequence of start-up windows for a number of start-sequences and purgings of the gas turbine engine 1 is schematically shown in FIG. 3. The Figure shows a fuel flow demand as a function of time. During a start-up window 201 to 209 the fuel flow is ramped up which is indicated by the diagonal line in each start-up window 201 to 209. The fuel flow demand can be adapted to the rotation speed of the gas turbine engine either so as to provide a fixed fuel/air ratio during a start-up window or so as to provide an increasing fuel/air ratio. During each light-up window, which typically lasts for 2 to 10 seconds, a number of sparks is provided by an ignition system in order to achieve light-up.

Each purging signal output by the processor unit 5 to the gas turbine engine 1 is also received by a software or hardware counter 19. Upon receiving a purging signal the counter counts up, and when a maximum count number is reached a stop signal is output from the counter 19 to the processor unit 5. The stop signal causes the processor unit 5 not to continue with the output of purging signals and to output a shut down signal to the gas turbine engine 1.

FIG. 2 shows a flow diagram for an embodiment of the inventive method of starting a gas turbine engine. Upon starting the method in step 101, the counting value i is set to 1 and a start-up window is initialised in step 103. Initialising the start-up window contains setting starting end points for ramping up the turbine speed and/or the fuel/air mixture in the combustion system. The method then proceeds to step 105, in which the start sequence for the gas turbine engine 1 is initiated. During the start sequence, the ignition monitor 9 monitors ignition in the engine. If a successful ignition is detected in step 107, i.e. a successful light-up, the gas turbine engine 1 is transferred into its usual operating mode in step 108.

If, in step 107, no successful light-up is detected by the end of the start sequence, it is checked in step 109 whether the counting value i is still smaller than a maximum counting value $i_{max}$. In case of no, the method is terminated and a shut down of the gas turbine engine 1 is performed. If the counting value i is still smaller than the maximum counting value $i_{max}$ a purging signal is output by the processor unit 5 to the gas turbine engine 1 in step 111. It is also output to the window generator 7 and causes the window generator 7 to generate another start-up window which is shifted and/or scaled with respect to the start-up window of the preceding start sequence. The shifting and/or scaling may, e.g., follow a preset shift sequence and/or scale sequence. The new start-up window is output to the processor unit 5, and 115, the counting value i is increased by one in step 115. The method then returns to step 105, in which the new starting sequence with the shifted and/or scaled start-up window is initiated. The described method continues until successful light-up is detected or the maximum counting value $i_{max}$ is reached.

The inventive method enables the use of shorter start-up windows and hence lower ramp rates but still gives coverage to wide variations in the actual optimum range window. Overall this therefore increases the number of ignition opportunities (sparks from the igniture) in the actual optimum fuel-to-air mixture window for each start-up attempt. Hence, the probability of light-up is increased.

The invention claimed is:

1. A method of starting a gas turbine engine via a start sequence, comprising:
    coordinating turbine speed and fuel delivery to provide a fuel/air mixture at an ignition device of the gas turbine permitting a successful ignition;
    purging the gas turbine engine if a successful ignition has not occurred by the end of the start sequence; and
    repeating the start sequence after purging the gas turbine engine,
    when repeating the start sequence the fuel/air ratio of the fuel/air mixture is varied through a range of fuel/air ratios at which starting is most likely to occur in the start sequence, and in that the range of fuel/air ratios for the current start sequence is shifted and/or scaled in respect to the previous start sequence,
    wherein the shifting the range of the fuel/air ratios causes a start point of the fuel/air ratios of the current start sequence to be shifted in respect to a start point of the fuel/air ratio of the previous start sequence, and
    wherein the scaling of the range of the fuel/air ratios is a product of the range of the fuel/air ratios and a scale factor which results in the range of the fuel air ratios of the current start sequence to increase or decrease in respect to the range of the fuel/air ratios of the previous start sequence.

2. The method as claimed in claim 1,
    wherein the turbine speed is varied through a range of turbine speeds at which starting is most likely to occur in the start sequence, and the range of turbine speeds is shifted and/or scaled when repeating the start sequence.

3. The method as claimed in claim 1,
    wherein the shifting and/or scaling of the range of turbine speeds and/or the range of fuel/air ratios follows a fixed scheme.

4. The method as claimed in claim 1,
    wherein the purging and repeating of start sequences stops if a predetermined stop condition is reached or a successful ignition is detected.

5. A control device that controls a start of a gas turbine engine, comprising:
    a window generator that generates a window signal representing a range of turbine speeds and/or a range of fuel/air ratios at which starting is most likely to occur, wherein
    a processor unit, which is connected to the window generator, that receives the window signal, begins a start sequence for the gas turbine engine and varies the turbine speed and/or a mixing ratio of a fuel/air mixture within the range of turbine speeds and/or the range of fuel/air ratios defined by the window signal during the start sequence; and
    an ignition monitor that monitors the success of the start sequence adapted to generate a condition signal representing success or failure of ignition after the start sequence has finished
    wherein the processor unit is connected to the ignition monitor to receive the condition signal after the start sequence is finished, the processor unit generates a purging signal when the condition signal indicates a failure of ignition and outputs the purging signal to the gas turbine engine which causes a purging of the engine, and the processor unit begins another start sequence after the purging is finished,
    the window generator comprises a shifting unit and/or scaling unit which is/are connected to the processor unit and when another start sequence begins the window generator is adapted to shift or scale for the current start sequence in respect to the previous start sequence, respectively, the range of turbine speeds and/or the range of fuel/air ratios when it receives the purging signal,
    wherein the shifting the range of the fuel/air ratios causes a start point of the fuel/air ratio of the current start sequence to be shifted in respect to a start point of the fuel/air ratio of the previous start sequence,
    wherein the scaling of the range of the fuel/air ratios is a product of the range of the fuel/air ratios and a scale factor which results in the range of the fuel air ratios of the current start sequence to increase or decrease in respect to the range of the fuel/air ratios of the previous start sequence,
    wherein the shifting the range of the turbine speeds causes a starting speed of the current start sequence to be shifted in respect to a starting turbine speed of the previous start sequence, and
    wherein the scaling of the range of the turbine speeds is a product of the range of the turbine speeds and a scale factor which results in the range of the turbine speeds of the current start sequence to increase or decrease in respect to the range of the turbine speeds of the previous start sequence.

6. The control device as claimed in claim 5, further comprising a counter connected to the processor unit that receives the purging signal and counts the number of purges and outputs a stop signal causing the processor unit not to begin another start sequence when a preset number of purges has been counted.

7. The control device as claimed in claim 5, wherein the range of the fuel air ratios are shifted or scaled.

8. The control device as claimed in claim 5, wherein the range of the turbine speeds are shifted or scaled.

\* \* \* \* \*